United States Patent [19]

Cohen

[11] Patent Number: 5,035,803

[45] Date of Patent: Jul. 30, 1991

[54] HIGH YIELD WATER-SOLUBLE POLYMER SILICA SEPARATION RESINS

[75] Inventor: Yoram Cohen, Los Angeles, Calif.

[73] Assignee: The Regents of the University of California, Berkeley, Calif.

[21] Appl. No.: 310,744

[22] Filed: Feb. 14, 1989

[51] Int. Cl.$^5$ .................. C02F 1/28; B01D 15/04; B01J 20/10

[52] U.S. Cl. .................. 210/656; 428/404; 428/405; 428/407; 210/679; 210/691; 210/807; 502/407; 528/32; 528/39

[58] Field of Search ............ 428/403, 404, 405, 407; 502/407; 210/656, 691, 679, 807; 528/32, 39; 525/479

[56] References Cited

U.S. PATENT DOCUMENTS

| 4,431,544 | 2/1984 | Atkinson et al. | 210/635 |
| 4,705,725 | 11/1987 | Glajch et al. | 428/405 |
| 4,778,909 | 10/1988 | Karger et al. | 556/450 |

OTHER PUBLICATIONS

"Chemical Grafting of Vinyl Heterocyclic Monomers to the Surface of Mineral Carriers" by Korshak et al., Polymer Science USSR, vol. 21, pp. 1243–1250.

"Adsorption and Chromatographic Properties of Modified Silica Sorbents for the Production of Viral Preparations" by Krasilnikov, et al., *Journal of Chromatography*, 446 (1988) 211–219.

"Study of the Chemistry of the Surface of an Adsorbent Based on Silokhrom and N–Vinylpyrrolidone" by Zubakova, et al., *Khimii*, vol. 60, No. 7, pp. 1491–1494, Jul. 1987.

*Primary Examiner*—George F. Lesmes
*Assistant Examiner*—Christopher Brown
*Attorney, Agent, or Firm*—Poms, Smith, Lande & Rose

[57] ABSTRACT

Separation resins are disclosed where silica particles are surface activated by attaching a vinyl terminated lower alkoxy silane to the silica particle and then hydrolyzing the particles. The resulting hydrolyzed particles are hydrophilic and retain at least 10 micromoles of the hydrolyzed vinyl terminated lower alkoxy silane per square centimeter of the silica. A water soluble polymer is then graft polymerized onto the activated and hydrolyzed silica particles. The large amount of hydrolyzed vinyl terminated lower alkoxy silane which remains on the silica along with the hydrophilic nature of the hydrolyzed silica produces an activated particle which is useful for graft polymerization of water soluble polymers onto the particles in large amounts not previously possible. A method for preparing the separation resins is also disclosed.

8 Claims, No Drawings

HIGH YIELD WATER-SOLUBLE POLYMER SILICA SEPARATION RESINS

REFERENCE TO GOVERNMENT

This invention was made with Government support under Grant Nos. CTB-84-16719 and CDR-86-22184 awarded by the National Science Foundation and Grant No. 14-08-0001-G1315 awarded by the U.S. Geological Survey. The Government has certain rights in this invention.

FIELD OF THE INVENTION

The invention broadly relates to three areas:

(1) A method for producing silica particles which are surface activated with vinyl hydroxysilane, the amount of vinyl hydroxysilane on the surface of said silica particles greatly exceeding that which is known in the art;

(2) A solid separation resin comprising said surface activated solid silica particles which have graft polymerized on the surface a water soluble vinyl polymer, the amount of water soluble vinyl polymer greatly exceeding that which is known in the art; and (3) A method for making said solid separation resin.

The solid separation resin is very useful for aqueous exclusion chromatography in separating higher molecular weight organic compounds (e.g. polymers, proteins and viruses) and the adsorption of a variety of organic chemicals from aqueous systems.

BACKGROUND OF THE INVENTION

It is suggested in the art that surface activated silica particles having grafted polymers on the surface thereof may be useful in chromatography and for adsorbing a variety of organic compounds from water. However, heretofore it was thought by those skilled in the art that incomplete coverage by the surface activating compound on the silica particles was very beneficial to insure wetting and to graft polymerize a water soluble polymer onto the surface of said silica particles. See, for example, "Study of the Chemistry of the Surface of An Adsorbent Based on Silokhrom and N-Vinylpyrrolidone", Zubakova et al., Zhurnal Prikladonoi Khimii, vol. 60, 1491-1494 (1987). In this article, the authors state that when using acetone as a solvent they obtain a surface coverage on the silica of 2 micromoles of vinyl triethoxysilane per square meter of silica. After the surface activating step the author then state that they graft polymerize polyvinylpyrrolidone onto the silica in order to obtain 1.6 milligrams of polyvinylpyrrolidone per square meter of silica.

The present invention differs substantially from that of the Zubakova et al. article in that in the present invention a vinyl lower alkoxy silane is chemically bonded to silica particles using a lower alkyl benzene as a solvent for the vinyl loweralkoxy silane to obtain a surface coverage on the silica of at least 10 micromoles of the vinyl loweralkoxy silane per square meter of silica particles. The lower alkoxy moieties are then hydrolyzed to hydroxyl groups. I have found that even with having the silane compound cover such a large surface area that wetting is ideal and that graft polymerization of the surface activated silica particle is enhanced when utilizing a water soluble vinyl polymer. In fact, I have found that when I graft polymerize thereon a water soluble vinyl polymer, I obtain at least about 2.5 milligrams of said water soluble polymer per square meter of said silica particles. This was truly surprising and unexpected.

A subsequent paper by Krasilmikov, et al. entitled "Adsorption and Chromatographic Properties of Modified Silica Sorbents for the Production of Viral Preparations"Journal of Chromatography, 446, 211-219 (1988), states that preparing silica resins using the process of Zubakova, et al., produces a solid separation resin useful in purifying viruses. The amount of polyvinylpyrrolidone attached to the surface of the silica particles is not mentioned by the author. In view of the fact that they used the same method as described by Zubakova, et al., the amount of polyvinylpyrrolidone cannot have exceeded 1.6 mg/m$^2$.

A paper by Korshak, et al., entitled "Chemical Grafting of Vinyl Heterocyclic Monomers to the Surface of Mineral Carriers", Vysokomol. Soyed, A21:No5, 1132-1138 (1979) disclose s a method for chemical grafting of polyvinylpyrrolidone onto silica particles surface activated with vinyl trichloro silane.

The author reports that the highest amount of grafted vinyl groups onto the surface of the silica particles was only 4.4 micromoles of vinyl trichloro silane per square meter of silica particles. On page 1250 of the article, the author further report that the grafting of polyvinylpyrrolidone on the surface activated silica particles resulted in a yield of only about 1.1 mg/m$^2$ which, coincidentally, is about the amount of polymer that can be physically adsorbed.

The three articles cited above provide, to those skilled in the art, very sketchy information and none of the articles disclose or suggest that the author actually grafted more polymer onto the silica particles than could be physically adsorbed from the reaction mixture.

In contrast, in my invention, the amount of chemically grafted vinyl water soluble polymer is much higher than the amount that can be physically bonded and my separation-resins are very useful in the separation of higher molecular weight organic compounds from aqueous systems as well as adsorbing chemical compounds which are attracted to the grafted vinyl water soluble polymer from aqueous systems.

SUMMARY OF THE INVENTION

The present invention is predicated upon a number of surprising findings. First, using the method of the present inventions, silica particles having surface hydroxy groups can be surface activated with vinyl loweralkoxy silane. It should be noted that when I speak of vinyl lower alkoxysilane I mean a compound having the formula of:

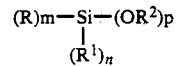

wherein R is an organic group, R$^1$ is an organic group containing at least one vinyl radical, R$^2$ is lower alkyl, m is 0, 1 or 2, n is 1 to 3, p is 1 to 3 and the sum of m, n and p is 4.

It is preferred if R$^1$ is loweralkylene (e.g. alkyl) which may contain oxygen (e.g. lower alkylene oxide). It is also preferred if R is lower alkyl or oxygen containing lower alkyl.

After the vinyl lower alkoxysilane is chemically bonded to the surface of the silica particles, the lower alkoxy groups are hydrolyzed to produce silica particles having at least 10 micromoles of vinyl hydroxysilane per square meter of silica particles. This is achieved without sacrificing the wettability of the surface activated silica particles, thereby allowing for high graft polymerization yields on the surface of the silica particles when utilizing a water soluble vinyl monomer.

The solid porous or impermeable silica particles used as the solid substrate in the present invention are well known in the art and therefore no detailed exemplification thereof will be given herein. Such silica particles will have surface hydroxyl groups for chemically bonding the vinyl loweralkoxy silane to the surface of the silica particles. Generally speaking, the pulverulent solid silica particles will be of a normal size known in the art useful in solid separation resins in, for example, high pressure liquid chromatography, aqueous exclusion chromatography of water soluble higher molecular weight organic compounds (e.g. polymers, proteins, viruses, etc.) and the adsorbtion of organic compounds from aqueous systems in general. The diameter of such solid impermeable silica particles will vary but in general will be from about 5 microns to about 40 microns.

Silica particles having surface hydroxyl groups found to be useful in the present invention include silica gel, fumed silica, silica sand, quartz, glass beads, etc.

It should be noted that any silica particles having surface hydroxyl groups (either naturally occurring or chemically modified to produce such surface hydroxyl groups) are useful in the present invention. However, when the surface activated silica particles having graft polymerized thereon a water soluble vinyl polymer are used to separate high molecular weight water soluble organic compounds, one from the other, the silica particles utilized as the substrate must be porous and have a substantially uniform pore size. The size of the pores are not critical and will depend on the particular molecular weight of the water soluble organic compounds desired to be separated. At present, commercially available silica particles have a porosity ranging from about 60 Angstroms to about 4,000 Angstroms.

As noted previously, the compound used to activate the surface of the solid silica is a vinyl loweralkoxy silane. In order to achieve high surface coverage of the vinyl loweralkoxy silane, (i.e. so that said vinyl loweralkoxy silane covers the surface of the silica in an amount of 10 micromoles of vinyl silane per square meter of silica particles), it is presently believed necessary to utilize, as a solvent, lower alkyl benzene such as toluene, phenylpropane, ortho, meta, or paraxylene, etc. When using this type of solvent, high surface coverage of the silica is achieved by the vinyl loweralkoxy silane, such yields being, for example, from 10 micromoles per square meter to as high as about 35 micromoles per square meter.

The temperature of the reaction is not critical; however, higher temperatures increase the speed of the reaction. Generally speaking, the reaction may occur between room temperature and the boiling point of the solvent. It is preferred if the temperature used is above the boiling point of the lower alkyl alcohol formed by the reaction and slightly below the boiling point of the highest boiling point component; generally the solvent or silane. For example, if xylene and vinyl triethoxy silane are used, the preferred range would be between about 80° C. and about 140° C.

Reaction is achieved by placing the solution of lower alkyl benzene and vinyl loweralkoxy silane in a reflux condenser with silica particles and heating the mixture above the boiling point of the thus produced alcohol (which is produced by the reaction of the lower alkoxy group with the hydroxyl group on the silica) but slightly below the boiling point of the solvent. The time necessary for surface coverage in excess of about 10 micromoles of vinyl alkoxy silane per square meter of silica particles varies to some extent depending upon the temperature and the amount of vinyl loweralkoxy silane in the lower alkyl benzene. In general, I have obtained satisfactory results in from about three to ten hours.

In any event, the reflux condenser is so arranged that the displaced alcohol is removed but the vapors of vinyl loweralkoxy silane and lower alkyl benzene are condensed and returned to the reaction mixture.

Since vinyl loweralkoxy silanes are well known in the art, no detail exemplification thereof will be given. Exemplary vinyl loweralkoxy silanes include diallyl dimethoxy silane, allyl triethoxy silane, ethyl vinyl dimethoxy silane, divinyl diethoxy silane and, preferably, vinyl triethoxy silane and vinyl trimethoxy silane.

After the silica particles are chemically bonded with an adequate amount of vinyl terminated loweralkoxy silane, the resulting surface activated silica particles are washed with the lower alkyl benzene and allowed to dry.

Thereafter, the lower alkoxy groups are hydrolyzed in order to render the silica particles hydrophilic. Such a hydrolysis step can be accomplished in a number of different ways known to those skilled in the art. For example, the hydrolysis step may be performed by dispersing the silica particles in water to which a base has been added in order to adjust the pH to between about 8 and 10. The hydrolysis step may be performed at ambient temperature and the silica particles allowed to remain in the alkaline water for a sufficient period of time to complete the hydrolysis of the lower alkoxy groups to hydroxyl groups (e.g. for one to five days). After the hydrolysis step, the silica particles are hydrophilic as opposed to being hydrophobic prior to the hydrolysis step.

The base used in the hydrolysis step may be any base, either weak or strong, inorganic or organic. For examples, basic compounds useful in the present invention include sodium hydroxide, calcium hydroxide, potassium hydroxide, etc.

The silica particles having been chemically bonded to the surface thereof vinyl hydroxyl silane in an amount of at least 10 micromoles of said vinyl hydroxyl silane per square meter of said silica are then ready to be graft polymerized with a water soluble vinyl monomer. Graft polymerization allows for chemically bonding the resulting water soluble vinyl polymer onto the surface of the surface activated silica. It should be noted that by "graft polymerization" I mean the growth of polymer chains from the surface active site (i.e. the vinyl group) by step or chain polymerization. This is to be distinguished from polymer grafting which involves the bonding of previously synthesized polymer chains from a bulk phase to the support surface. Polymer grafting is not satisfactory for use in this invention because polymer molecules must diffuse to the solid surface and therefore diffusional limitations and steric hindrance severely reduce the degree of surface coverage and graft yield obtained. In complete contrast thereto, in graft polymerization, the diffusion limitations and steric hindrance effects are substantially diminished due to the smaller size of the monomer molecules and therefore a higher surface concentration and a more uniform surface coverage is possible.

Water soluble vinyl monomers which are polymerized to water soluble vinyl polymers and are useful in the present invention are generally well known in the art and include acrylic acid, methacrylic acid, and particularly vinyl heterocyclic compounds such as vinyl-pyridines (e.g. 4-vinylpyridine or 4-vinylpyrrolidone-N-oxide) and vinylpyrrolidones such as N-vinyl pyrrolidone.

When utilizing the surface activated silica particles of the present invention, I obtain surface coverage of the water soluble vinyl polymers much in excess of the amount which has been reported by prior art workers. For example, the yield achieved by the present invention is at least about 2.5 mg/m$^2$. o The graft polymerization is preferably performed in the absence of oxygen, which is believed to lengthen the polymerization reaction. Preferably, the graft polymerization reaction is conducted under an inert gas atmosphere such as nitrogen. The reaction is conducted by placing the surface activated silica particles into a reaction vessel with a solution of the water soluble vinyl monomer in water. Inasmuch as the reaction is a typical free radical reaction, it is also necessary to have an initiator such as diazo compounds or a peroxide. Examples of peroxides are hydrogen peroxide and water soluble organic peroxides including t-butyl hydroperoxide. Examples of diazo compounds are (2,4-dimethyl-valeronitrile) and azodisulfonic acid.

It is also preferred, in the case of PVP, if a basic cocatalyst such as ammonium hydroxide is used which prevents the formation of undesirable aldehyde by-products under acidic conditions. Moreover, the polymerization reaction is shortened by utilizing such a basic co-catalyst.

The temperature of the reaction is believed not to be particularly critical but does affect the speed of the reaction and may range from about 50° C. to about 80° C. Of course, lower temperatures may be used but the reaction time is lengthened.

The rate of reaction is, to some extent, governed by the concentration of the solution. For example, I have found that as little as a 10% weight solution of the vinyl monomer in water is satisfactory but it is preferred if the concentration is higher, for example 20% to as high as 50%.

The reaction time may also vary greatly depending upon the temperature and the concentration of the water soluble vinyl monomer. Generally speaking, the reaction to obtain the desired graft yield will take from about two to ten hours.

The solid separation resins of the present invention are useful in a number of ways. First, the solid separation resins are excellent in separating higher molecular weight water soluble organic compounds, e.g. polymers, proteins and viruses having a molecular weight of between about 200 to as high as about 1,000,000 or even higher, which are in aqueous systems. In this regard, it should be noted that for the solid separation resins to be useful in separating higher molecular weight water soluble organic compounds, the silica particles, used as the solid substrate, must be porous. The molecular weight of the water soluble organic compounds which may be separated is directly related to the size of the pores of the silica particles. For example, the size of the lowest molecular weight water soluble organic chemical compounds which can be separated by size from larger water soluble organic chemical compounds, must be greater than the average pore size of the silica particles. If the average pore size of the silica particles is 1000 Angstroms, then, in general, the molecular weight of the water soluble organic chemical compound must be greater than about 15,000 and can range to as high as about 400,000. On the other hand, if the average pore size of the silica particles is 100 Angstroms, then water soluble organic compounds can be separated having a molecular weight as low as about 200. From the foregoing, it can be seen that water soluble chemical compounds of almost any molecular weight can be separated from each other due to the difference in molecular weight. The only limitation is the availability of silica particles of varying pore size. For example, it is presently believed that commercially available silica particles have a pore size ranging from 60 Angstroms to 4,000 Angstroms. However, if the pore size of commercially available silica particles is reduced below 100 Angstroms, then there is a corresponding reduction in the lowest molecular weight of the water soluble organic chemical compounds which may be separated by the present invention. Conversely, if commercially available silica particles become available having an average pore size larger than 4,000 Angstroms, then corresponding molecular weight of the water soluble chemical compounds which may be separated may correspondingly increase over 1,000,000.

The water soluble chemical compounds which may be separated by the present invention are those which are not attracted to the graft polymer on the silica substrate. The reason for this is because when separating water soluble organic compounds by molecular weight, the water soluble organic compounds should not be adsorbed on the graft water soluble polymer. Instead, the water soluble organic chemical compounds to be separated will diffuse through the solid separation resin and not be attracted to or adsorbed on the graft polymer. The higher molecular weight water soluble chemical compounds pass through the column first with the lower molecular weight organic chemical compounds passing through last and therefore the water soluble chemical compounds are separated on the basis of their molecular weight.

Another and substantial use of the water soluble polymer silica separation resins of the present invention is to purify aqueous systems (e.g. water) having contaminated organic chemical compounds which are attracted to the graft polymer on the silica particles. This attraction, whether it occurs because of an acid-base relationship, dipole-dipole attraction, hydrogen bonding, etc., causes the chemical compound to be adsorbed onto the solid separation resin and thus allows the water to be purified.

Given below are presently preferred embodiments, which are set forth solely in order to more fully illustrate the invention, being understood that such examples are not to be considered limiting.

EXAMPLE 1

Production of Impermeable Surface Activated Silica Particles

Non-porous silica particles (Novacite L207-A), with an average diameter of 5.0 micrometers, were utilized in this example. Surface silylation was carried out with vinyltriethoxysilane. Reagent grade xylene was utilized as the solvent.

Prior to silylation, the silica particles were washed with dilute hydrochloric acid and dried at 150° C. under a vacuum to remove surface water. The organic silylation reaction was performed in a reflux condenser, for five hours, using a 10% weight solution of vinyltriethoxysilane in xylene. The condenser was kept at a temperature above the boiling point of the displaced ethanol but below the boiling point of the solution. The approximate temperature used was 137° C. After five hours, the silica particles were removed from the reflux condenser and washed several times with xylene and cured overnight at 50° C. to produce surface activated silica particles having approximately 33 micromoles of vinyltriethoxysilane per square meter of silica particles. This was determined by thermogravimetric analysis.

EXAMPLE 2

Hydrolysis of Alkoxy Groups

The surface activated silica particles of Example 1 were used in this example. The surface active silica particles of Example 1 were disbursed in water to which the pH was adjusted to 9.5 by adding sodium hydroxide. The surface activated silica particles were maintained in this alkaline water for approximately three days. After three days, the silica particles having vinyltrihydroxysilane chemically bonded to the surface thereof were removed and dried. It was determined by a thermogravimetric analysis that the silica particles had chemically bonded thereto about 30 micromoles of vinyltrihydroxysilane per square meter of silica particles.

EXAMPLE 3

Graft Polymerization

The surface active silica particles obtained in Example 2 were utilized herein. The graft polymerization reaction was performed in a one liter jacketed reaction flask under a nitrogen atmosphere in order to eliminate atmospheric oxygen. Polymerization reaction consisted of first placing about four grams of surface activated silica particles obtained as set forth in Example 2 into a reaction vessel together with a 200 milliliter solution of vinylpyrrolidone monomer and deionized water, said solution containing about 50 weight percent of vinylpyrrolidone.

To the aqueous solution of vinylpyrrolidone monomer was added 1.0 ml. of hydrogen peroxide (30 vol. percent) and 0.4 ml. of ammonium hydroxide (58 vol. percent). A nitrogen atmosphere was provided in order to eliminate atmospheric oxygen which leads to an increase in the latent period of polymerization as well as a reduction in the rate of polymerization. The solution was heated to a temperature of 70° C. and kept at this temperature for about ten hours. The amount of polyvinylpyrrolidone grafted onto the surface activated silica particles was 2.5 mg. PVP/m². The estimated lower limit of the number average molecular weight of the PVP was about 1500.

EXAMPLE 4

Production of Porous Surface Activated Silica Particles

Porous silica particles with an average diameter of 40 micrometers, a surface area of 440 m²/g and an average pore size of 80 Angstroms were used in this example. Surface silylation was carried out with vinyltriethoxysilane utilizing xylene as the solvent.

The procedure for chemically bonding the vinyltriethoxysilane onto the porous silica particles was identical to the procedures set forth in Example 1. After the reaction, it was determined by thermogravimetric analysis that the porous silica particles had approximately 30 micromoles of vinyltriethoxysilane per square meter of silica particles.

EXAMPLE 5

Production of Porous Surface Activated Silica Particles

The procedure and reagents of Example 4 were utilized in this example except that instead of utilizing porous silica particles of a pore size of 80 Angstroms there was used silica particles of average diameter of 10 microns having an average pore size of 1000 Angstroms. After chemically bonding the vinyltriethoxysilane to the surface of the silica particles by using the method of Example, it was determined that the surface of the silica particles had about 30 micromoles of vinyltriethoxysilane per square meter of silica particles.

EXAMPLE 6

Hydrolysis of Ethoxy Groups

The surface activated silica particles of Examples 4 and 5 were used in this example. The ethoxy groups were hydrolysed to hydroxy groups using the exact methods set forth in Example 2. Again it was determined by thermogravimetric analysis that the silica particles had chemically bonded thereto about 30 micromoles of vinyltrihydroxysilane per square meter of silica particles.

EXAMPLE 7

Graft Polymerization

The surface activated silica particles obtained in Example 6 having a substantially uniform pore size of about 1000 Angstroms were used in this example. Vinylpyrrolidone was graft polymerized on such surface activated silica particles using the exact procedure set forth in Example 3. There was obtained silica particles having polyvinylpyrrolidone grafted thereon in an amount of 2.5 mg. of polyvinylpyrrolidone per square meter of silica particles.

EXAMPLE 8

Solid Separation Resin

The silica-PVP grafted resin prepared in accordance with Example 7 was used in this example. A column was packed with the particles obtained in Example 7 having a size of 10 micrometers and an average pore size of 1000 Angstroms. The column was approximately 25 centimeters long.

| Size Exclusion Chromatography | | |
|---|---|---|
| particles - size | = 10 microns | |
| morphology | = spherical | |
| average pore size | = 1000 Angstroms | |
| Temperature | = 23° C. | |
| Polymer Standards | | |
| Polyethylene glycol (PEG), | MW = | 202-22,000 |
| Polyethylene oxide (PEO), | MW = | 18,000-1,000,000 |
| Polyvinylpyrrolidone: | MW = | 10,000 |
| | | 24,000 |
| | | 40,000 |
| | | 360,000 |
| size exclusion limits: | low MW cutoff - 1,000 | |
| | high MW cutoff - 1,000,000 | |
| Results: | excellent column stability | |
| | excellent size exclusion behavior | |

EXAMPLE 9

Solid Separation Resin

Silica particles having grafted thereon polyvinylpyrrolidone were added to 13 milliliter glass vials. The amount of grafted silica particles being added to the glass vials were approximately 7 grams. The tubes were filled to the top with an aqueous solution of phenol, the concentration of phenol being 5-100 ppm. Mixing of the phenol solution PVP polymer-grafted silica was done by mounting the tubes on a horizontal rotating rack that turned them gently end-over-end at 12 RPM. The tubes were given at least seven days for the solution to equilibrate with the silica particles before analysis.

After the seven days, it was determined by UV analysis that substantially all of the phenol was absorbed onto the PVP graft-polymerized silica particles.

The same procedure as set forth above was used with respect to aqueous solutions of chloroform.

Porous silica particles, 40 microns in diameter having a surface area of 440 $m^2/g$ and having grafted thereon polyvinylpyrrolidone, were added to 13 milliliter glass vials. The vials were filled to the top with an aqueous solution of chloroform and sealed with teflon-lined, screw-cap tops. The concentration of the chloroform solution added was between 65 parts-per-billion and 2.7 parts-per-million. The vials containing chloroform solution and PVP graft-polymerized silica particles were mixed by rotating on a rack that turned them end-over-end at 12 RPM; each vial was allowed 4 weeks to equilibrate with the chloroform solution before analysis.

After the 4 weeks, it was determined by gas chromatographic analysis (GC) that most of the chloroform was absorbed by the graft-polymerized silica particles.

The same basic procedure was used to separate trichloroethylene from an aqueous solution and it was determined by GC that most of the trichloroethylene was absorbed on PVP graft-polymerized silica particles.

I claim:

1. A solid separation resin consisting essentially of silica particles which are surface activated by having chemically bonded to the surface thereof vinyl hydroxysilane in an amount of at least 10 micromoles of said vinyl hydroxysilane per square meter of said silica particles, said vinyl hydroxy silane having been formed by hydrolysis of a vinyl terminated lower alkoxy silane attached to said silica particle, said surface activated silica particles having graft polymerized to the vinyl hydroxysilane a water soluble vinyl polymer in an amount of at least 2 milligrams of said water soluble vinyl polymer per square meter of said silica.

2. Solid separation resin according to claim 1 wherein said water soluble polymer is polyvinylpyrrolidone.

3. Solid separation resin according to claim 2 wherein said silica particles are porous.

4. Solid separation according to claim 3 wherein said porous silica particles have a substantial uniform pore size of about 100 Angstroms to about 4,000 Angstroms.

5. A method for removing organic compounds from water, comprising contacting said water having said organic compounds with an effective amount of solid separation resin consisting of silica particles having chemically bonded to the surface thereof vinyl hydroxysilane in an amount of at least 10 micromoles of said vinyl hydroxysilane per square meter of said silica particles, said vinyl hydroxy silane having been formed by hydrolysis of a vinyl terminated lower alkoxy silane attached to said silica particle, said vinylalkoxysilane having graft polymerized thereon a water soluble vinyl polymer in an amount of at least about 2 milligrams of said water soluble vinyl polymer per square meter of said silica particles having vinyl hydroxysilane chemically bonded to the surface thereof.

6. Method according to claim 5 wherein said water soluble vinyl polymer is polyvinylpyrrolidone.

7. A method according to claim 5 wherein said silica particles are impermeable.

8. A method for separating water soluble organic compounds of varying molecular weight dissolved in water, said water soluble organic compounds having a molecular weight of at least about 200 which comprises contacting said water soluble organic compounds with an effective amount of a solid separation resin consisting of porous silica particles having chemically bonded to the surface thereof vinyl hydroxysilane in an amount of at least 10 micromoles of said vinyl hydroxysilane per square meter of said porous silica particles, said vinyl hydroxy silane having been formed by hydrolysis of a vinyl terminated lower alkoxy silane attached to said silica particle, said porous silica particles having chemically bonded thereto vinyl hydroxysilane having graft polymerized thereon a water soluble vinyl polymer in an amount of at least about 2 milligrams of said water soluble vinyl polymer per square meter of said silica particles having vinyl hydroxysilane chemically bonded thereto.

* * * * *